(12) United States Patent
Strakovsky

(10) Patent No.: US 6,519,467 B1
(45) Date of Patent: Feb. 11, 2003

(54) METHODS AND APPARATUS FOR CONTROL OF FREQUENCY HOPPING IN AN ANALOG CORDLESS TELEPHONE

(75) Inventor: Leonid Strakovsky, Rumson, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/164,512

(22) Filed: Sep. 30, 1998

(51) Int. Cl.[7] ................................................. H04Q 7/20
(52) U.S. Cl. ........................ 455/462; 455/426; 375/132
(58) Field of Search ................................. 455/464, 462, 455/456, 426, 463, 63, 62, 69, 501; 375/132, 133, 134, 135, 302, 303, 304, 305, 285

(56) References Cited

U.S. PATENT DOCUMENTS

| | | | | |
|---|---|---|---|---|
| 4,383,323 A | * | 5/1983 | Timor | 455/381 |
| 5,142,534 A | * | 8/1992 | Simpson et al. | 370/95.1 |
| 5,528,623 A | * | 6/1996 | Foster, Jr. | 375/202 |
| 5,930,719 A | * | 7/1999 | Babitch et al. | 455/462 |
| 6,151,352 A | * | 11/2000 | Taki et al. | 375/132 |
| 6,278,722 B1 | * | 8/2001 | Evans | 375/133 |

* cited by examiner

Primary Examiner—Edward F. Urban
Assistant Examiner—Tilahun B Gesesse
(74) Attorney, Agent, or Firm—Priest & Goldstein, PLLC (57) ABSTRACT

A cordless telephone system comprising a handset and a base station. Each of the handset and the base station contains a transmitter and a receiver, preferably operating on different frequencies. At least one of the handset and the base station controls frequency hopping based on a signal received from the other of the handset and the base station. In a preferred embodiment, The handset transmitter transmits to the base station a combined signal including a digital portion and an analog portion. The base station separates the combined signal to recover the digital portion and the analog portion and employs the analog portion to convey communicated information and the digital portion to control frequency hopping in the transmitter of the base station. The handset transmitter provides a local oscillator signal to the handset receiver to enable frequency conversion in the handset receiver. The base station transmits to the handset a similar combined signal which is similarly separated and employed by the handset.

34 Claims, 7 Drawing Sheets

METHODS AND APPARATUS FOR CONTROL OF FREQUENCY HOPPING IN AN ANALOG CORDLESS TELEPHONE

FIELD OF THE INVENTION

The present invention relates generally to improvements to cordless telephony. More particularly, the invention relates to advantageous apparatus and methods for providing a frequency hopping cordless telephone.

BACKGROUND OF THE INVENTION

A typical cordless telephone system includes a base station and a handset. The base station is typically connected by wire to a central office. The handset communicates with the base station by cordless means, such as through radio frequency signals, without a direct physical connection to the base station. Cordless telephones allow considerable freedom and mobility to the user, allowing the user to move about while engaged in a call, and to conduct a call at a considerable distance from the base station. Presently, two preferred cordless systems exist, digital and analog. Analog systems provide the advantages of simplicity, low cost, and high sound quality, but are vulnerable to in-band interference or jamming. Moreover, analog systems may interfere with other telephones. For this reason, analog systems are restricted in power, resulting in a reduced range.

Digital systems exist, which have both advantages and disadvantages with respect to analog systems. Digital systems provide a digital processing gain, reducing susceptibility to inband interference, with the resistance to interference increasing with processing gain. Digital systems are less likely to interfere with other telephone systems, and are permitted greater transmit power than are analog systems. The combination of greater transmit power and digital processing gain provides digital systems with a significantly greater range than is possessed by analog systems. Disadvantages of digital systems are a much higher cost due to the need to have powerful processors to perform voice coding and decoding, as well as digital signal processing (DSP) to achieve processing gain. Many parts of a digital system transmitter and receiver, such as a modulator and demodulator, are subject to more stringent requirements than are the corresponding parts of analog systems, and are therefore more complicated. Moreover, digital voice coding, interleaving, and spreading take time to perform, delaying signal transmission. Delay is especially prevalent in systems employing time domain duplexing, in which transmitter and receiver work in turns, half time each. This delay is added to the delay caused by digital processing, and may create a problem called echo. Echo in digital systems produces a significant degradation of sound quality, with the amount and nature of the degradation being influenced by the amount of delay and the spectrum content of the reflection. Echo cancellation in digital systems of the prior art represents a considerable challenge and increases the cost of the system.

An important aspect of transmission in cordless telephone systems is spreading. Systems of the prior art commonly use one of two techniques. These techniques are direct sequence and frequency hopping. In direct sequence systems the information signal is multiplied by a pseudorandom sequence of bits, widening the spectrum of the resulting signal. The received signal is multiplied with the same sequence once again to despread it. Many well-known techniques exist for performing spreading and despreading.

In frequency hopping systems, information bits are grouped into frames. Each frame is transmitted on a different carrier frequency. Over a period of time, therefore, the energy of the signal is spread throughout the entire bandwidth. Frequency hopping systems are appropriate for a time division duplexed system ("TDD"), since the transmitter and receiver of a TDD must be rapidly switched on and off. The transmitter and receiver of a TDD employing a frequency hopping system repeat an on-off cycle, with each repetition of the cycle employing a different frequency. A TDD employing frequency hopping is particularly vulnerable to echo.

It is possible to combine direct sequence and frequency hopping spreading techniques. A system using these combined techniques would have a large processing gain and a high interference immunity, but would be complex and expensive. Due to an extensive processing and hopping delay, it would also be susceptible to echo.

A need therefore exists in the art for a cordless telephone system with a low cost, high processing gain with resulting high interference immunity, and resistance to echo.

SUMMARY OF THE INVENTION

A cordless telephone according to the present invention includes a handset and a base station wherein frequency hopping is controlled in at least one of the handset and the base station by a signal received from the other of the handset and the base station. Preferably the base station and the handset each have a transmitter and a receiver operating simultaneously on different frequencies. The handset performs frequency hopping according to information contained in a signal received from the base station and the base station performs frequency-hopping according to information in a signal received from the handset. Preferably, the frequency-hopping information is transmitted in a single signal together with user information, such as a voice communication to be transmitted by the handset.

In a preferred embodiment of the invention, the handset transmits to the base station a modulated carrier signal comprising a digital portion and an analog portion. The base station receiver receives the signal and demodulates it to recover the digital portion and the analog portion. The analog portion is employed to provide user information, while the digital portion is employed to generate a hopping control signal used to control frequency hopping by the base station transmitter. The base station transmitter also employs the hopping control signal to produce a local oscillator signal used to control frequency conversion in the base station receiver. Similarly, the base station transmits to the handset a modulated carrier signal containing a digital portion and an analog portion. The handset recovers the digital portion and the analog portion and employs the analog portion to provide user information, while employing the digital portion to control frequency hopping in the handset transmitter and receiver. The handset and base station employ the digital portions of the signals to provide for frequency hopping without an interruption of communication.

A cordless telephone according to the present invention includes advantages of an analog cordless telephone, together with processing gain and spread spectrum capabilities, having resistance to echo and a cost significantly below that of prior-art digital techniques. The combination of analog modulation and digital data provides frequency hopping without an interruption of communication.

A more complete understanding of the present invention, as well as further features and advantages of the invention, will be apparent from the following Detailed Description and the accompanying drawings.

DETAILED DESCRIPTION

Figure 1:
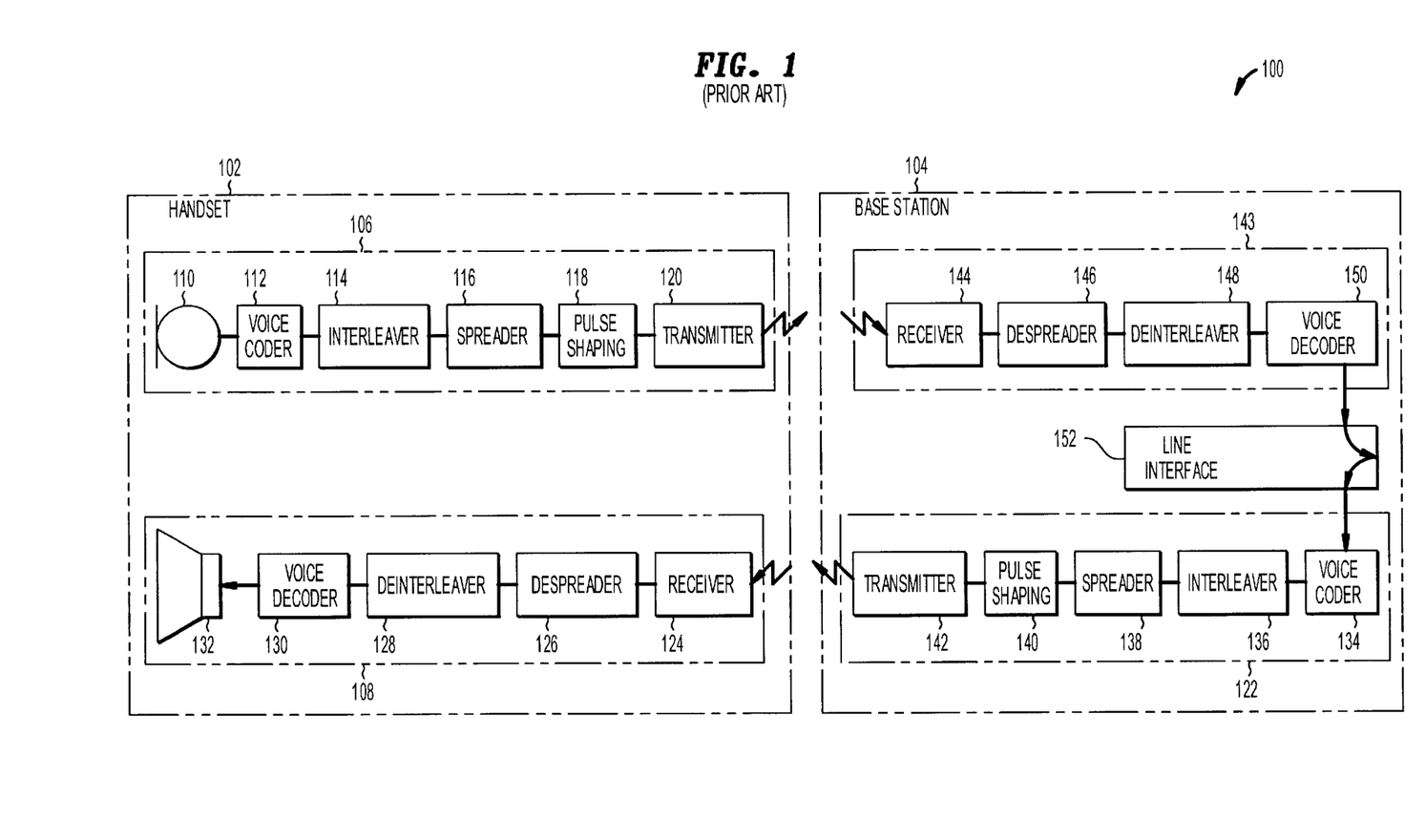
FIG. 1 illustrates a prior art cordless telephone system.

FIG. 1 illustrates a cordless telephone system 100 according to the prior art. The telephone system 100 includes a handset 102 and a base station 104. The handset 102 includes a transmission section 106 and a reception section 108. The transmission section 106 includes a microphone 110, which receives voice inputs from the user and produces a voice signal which is then passed to a voice coder 112. The voice coder 112 produces a coded signal which is then passed to an interleaver 114. The interleaver 114 produces an interleaved signal which is passed to a spreader 116. The spreader 116 spreads the interleaved signal to produce a spread signal, and passes the spread signal to a pulse shaper 118. The pulse shaper 118 produces a pulse-shaped signal which is then passed to a transmitter 120 for transmission to the base station.

The reception section 108 includes a receiver 124. The receiver 124 receives a transmission from the base station 104 to produce a received signal which is then passed to a despreader 126 to produce a despread signal. The despread signal is passed to a deinterleaver 128, which produces a deinterleaved signal and passes the deinterleaved signal to a voice decoder 130. The voice decoder 130 produces a voice decoded signal which is then passed to a loudspeaker 132, which produces audible sounds which can be heard by a user.

The base station 104 includes a transmission section 122 similar to the transmission section 106, which produces a signal for reception by the reception section 108 of the handset. The transmission section 122 includes a voice coder 134, an interleaver 136, a spreader 138, a pulse shaper 140, and a transmitter 142. The base station 104 also includes a reception section 143, which includes a receiver 144, despreader 146, deinterleaver 148, and voice decoder 150. The transmission section 122 operates similarly to the transmission section 106 of the handset 102, and the reception section 142 operates similarly to the reception section 108 of the handset 102. The transmission section 122 does not include a microphone, and the reception section 142 does not include a loudspeaker. Instead, the base station includes a line interface 152 which Epasses signals to and from a central telephone office (not shown). When the base station 104 receives a signal from the handset 102, the signal is processed by the reception section 142 (being subject to normal processing delays) and passed to the line interface 152. A portion of the signal is reflected from the telephone line (not shown) to the line interface 152 and passed along the transmission section 122, being subjected to similar processing delays. The delays result in an echo which is heard in the loudspeaker 132.

Analog telephones are subject to a reflection from the telephone line, but as analog telephones are not subject to processing delays, this reflection is much less harmful to analog telephone operation than to digital telephone operation.

Figure 2:
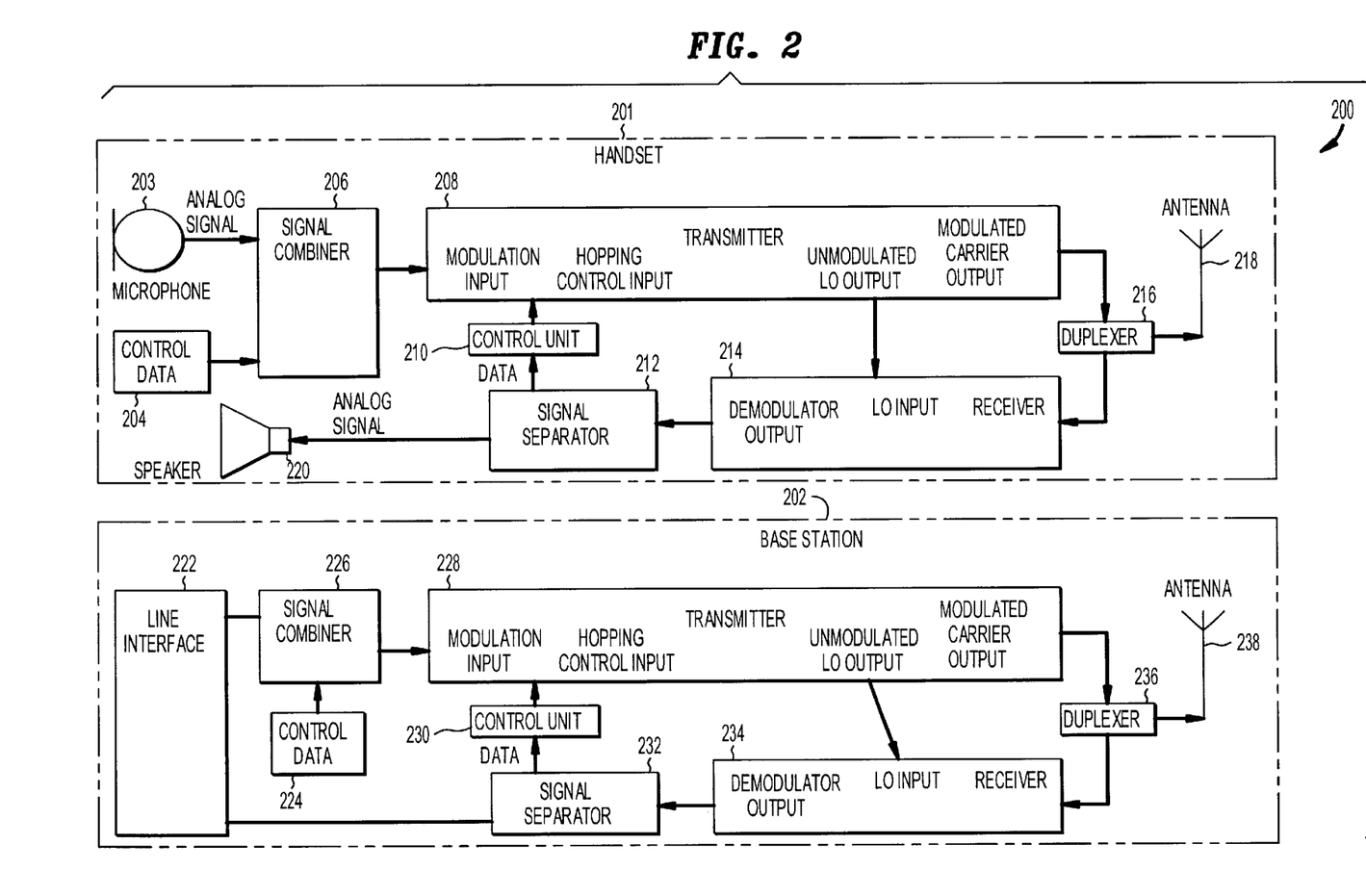
FIG. 2 illustrates a handset and base station for use in a cordless telephone system according to the present invention.

FIG. 2 illustrates a cordless telephone system 200 according to the present invention. The telephone system 200 includes a handset 201 and a base station 202. The handset 201 includes a microphone 203, a first control data unit 204, and a first signal combiner 206. The first microphone 203 provides a first analog signal to the first signal combiner 206, which also receives a first digital signal, used as a control data signal, from the control data unit 204. The first signal combiner 206 combines the first analog signal and the first control data signal to produce a first combined signal. The handset 200 further includes a first transmitter 208, a first control unit 210, a first signal separator 212, a first receiver 214, a first duplexer 216, a first antenna 218 and a loudspeaker 220. The first transmitter 208 receives the first combined signal from the first signal combiner 206, employing the first combined signal as a first modulation input signal. The first transmitter 208 receives a first hopping control signal for control of frequency hopping. The first transmitter 208 produces a first local oscillator signal, the first local oscillator signal preferably being an unmodulated signal, and being employed as a first local oscillator output, and a first modulated carrier signal, employed as a modulated carrier output. Modulation of the first modulated carrier signal is accomplished using the first modulation input signal received from the first signal combiner 206. The first modulated carrier signal thus includes a digital information and analog information. The first modulated carrier signal is received by the first duplexer 216, which passes the first modulated carrier signal to the first antenna 218 for transmission to the base station 202, while allowing the simultaneous reception of a second modulated carrier signal, similar to the first modulated carrier signal, transmitted from the base station 202 and received at the first antenna 218. The first receiver 214 employs the second modulated carrier signal received from the base station 202 and demodulates the second modulated carrier signal to produce a first demodulated signal, used as a first demodulated output. The first receiver 214 employs the first local oscillator signal from the first transmitter 208 as a local oscillator input, and employs the local oscillator input for frequency conversion in the first receiver 214. The first demodulated signal is provided to the first signal separator 212, which produces a first analog output signal which is provided to the loudspeaker 220, and a first digital output signal, employed as a data signal, which is supplied to the first control unit 210. The first control unit 210 produces the first hopping control signal which is provided to the transmitter 208.

The base station 202 includes a line interface 222, which receives a line input and produces a line output. The base station further includes a second control data unit 224 and a second signal combiner 226. The line output of the line interface 222 is provided as an input signal to the second signal combiner 226. The base station 202 further includes a second transmitter 228, a second control unit 230, a second signal separator 232, a second receiver 234, a second duplexer 236, and a second antenna 238. The second signal separator 232 provides a second analog output signal as the line input to the line interface 222. The base station 202 operates similarly to the handset 201 described above, except that the microphone 203 of the handset 201 is replaced in the base station 202 by the output of the line interface 222, and the loudspeaker 220 of the handset 201 is replaced in the base station 202 by the input to the line interface 222. The base station 202 employs the output from the line interface 222 as a second analog signal, and a second digital signal, to produce a second combined signal employed as a second modulation input signal which is provided to the second transmitter 228 for use in producing the second modulated carrier signal. The second transmitter 228 also produces a second local oscillator signal, which is preferably an unmodulated signal, and which is provided to the second receiver 234 as a second local oscillator input to enable frequency conversion in the second receiver 234. The second receiver 234 receives the first modulated carrier signal from the handset 201 and demodulates it to produce a second demodulated signal. The second demodulated signal is provided to the second signal separator 232, which produces a second analog output signal which is provided to the line interface 222, and a second digital output signal, employed as a second data signal, which is supplied to the second control unit 230. The second control unit 230 produces a second hopping control signal which is provided to the second transmitter 228.

Once communication is established between the handset 201 and the base station 202, the first transmitter 208 and the first receiver 214 operate simultaneously on different carrier frequencies. The first transmitter 208 receives the first combined signal as the first modulation input signal, as noted above. The first modulation input signal contains the first analog signal and the first data signal. The operation of the first transmitter 208 is controlled by the first control unit 210, which provides the first hopping control signal to the first transmitter 208. The first hopping control signal is based on digital information contained in the digital portion of the second modulated carrier signal received from the base station 202. The first control unit 210 may also be employed to provide data to the first signal combiner 206, in which case the first control data unit 204 is unnecessary. The first transmitter 208 generates the first modulated carrier signal, which is modulated through the use of the combined signal produced by the first signal combiner 206, provided to the first transmitter 208 as the first modulation input signal. The first transmitter 208 also generates the first local oscillator signal to enable a frequency conversion in the first receiver 214. Typically, frequency conversion is a down conversion, but frequency conversion may be accomplished in any of a number of ways commonly known in the art. As noted above, the first receiver 214 receives the second modulated carrier signal from the base station 202 and demodulates it. The first demodulated signal produced by the first receiver 214 by demodulating the second modulated carrier signal from the base station 202, has the same structure as the first modulation input signal described above, containing an analog portion containing user information and a digital portion containing frequency control data. The base station 202 operates simultaneously with, and in a similar fashion to, the handset 201.

The principle of a telephone system according to the present invention, such as the telephone system 200 illustrated in FIG. 2, is that in the handset the first modulated carrier signal and the first local oscillator signal hop simultaneously or very close to simultaneously, for example within a few microseconds. Similarly in the base station, the second modulated carrier signal and the second local oscillator signal also hop simultaneously or very close to simultaneously. The hopping interrupts the audio signal, but so briefly that the interruption is not noticed. Synchronization between base station and handset must be as close as possible, and the digital data transmitted together with the analog signal provides the control necessary to provide such close synchronization. Since the base station 202 and the handset 201 can send data simultaneously, it is well known to those skilled in the art how to use the data transferred between the base station 202 and the handset 201, as taught in the present invention, to synchronize the moment of frequency change. It is important to note that generation of the new frequency must be as quick as the synchronization itself, and for this reason traditional methods of generating a frequency signal (for example, phase locked loop frequency synthesizers with voltage controlled oscillators) are not acceptable. A typical phase locked loop takes a relatively long time to retune, on the order of hundreds of microseconds. Additionally, returning of a phase locked loop will create a frequency sweep resulting in strong pulses at receiver outputs and will also cause interference to all frequencies through which it sweeps. The first and second modulated carrier signals and the first and second local oscillator signals may preferably be generated using direct digital synthesis ("DDS") or a similar approach which allows sufficiently rapid frequency generation. DDS and other presently known techniques allow synchronization of 1 microsecond or better. Also, a combination of techniques could be used, such as using DDS for generating a hopping sequence and mixing it with another frequency source to obtain the final frequency value. Alternatively, any harmonic of any of the sources could be used. Modulation could be applied to any of the sources.

Figure 3:
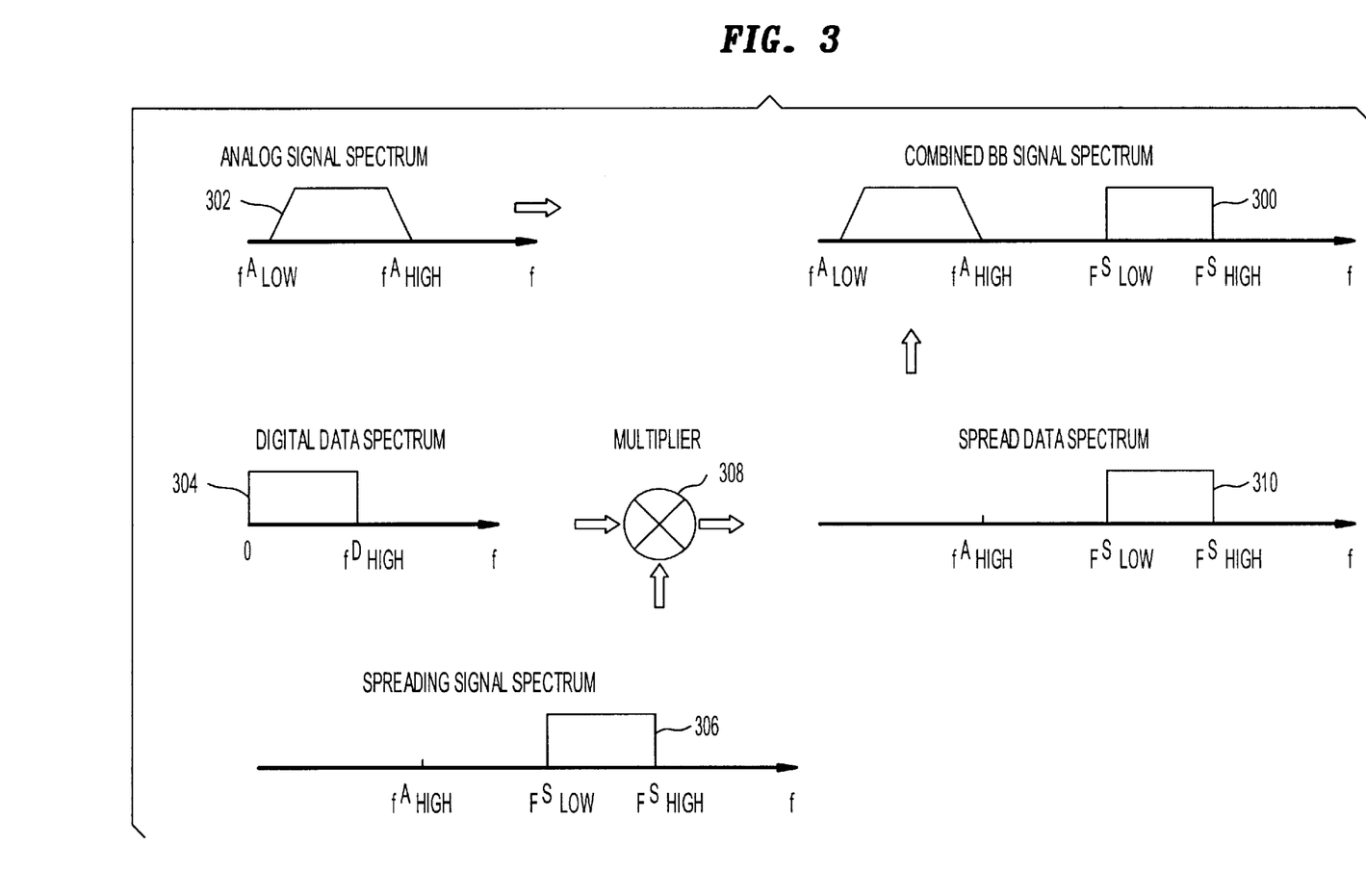
FIG. 3 illustrates a modulated carrier signal preferably employed by a cordless telephone system according to the present invention.

FIG. 3 illustrates the structure of a signal spectrum 300 suitably used as a first modulation input signal or a second modulated input signal employed by a telephone system according to the present invention. The base-band signal spectrum 300 is formed from an analog signal spectrum 302 and a digital data spectrum 304. The digital data spectrum 304 is multiplied by a spreading signal spectrum 306, and also by a multiplier 308, to produce a spread data spectrum 310 above the highest frequency of the analog signal spectrum 302. The spread data spectrum 310 is combined with the analog signal spectrum 302 to produce the base-band signal spectrum 300. The simplest implementation of spreading is Manchester coding, but more complex spreading schemes are known in the art and may also be suitably implemented. Alternatively, the data may be arranged to have the needed spectrum without requiring spreading. Moreover, if a different method is developed which allows the spectra to overlap but still be successfully combined and separated, such a method could be used to create the combined analog-digital signal. The analog signal spectrum may theoretically have a low frequency as low as 0 Hz, although in present-day practical telephony systems such a spectrum is not used.

Figure 4:
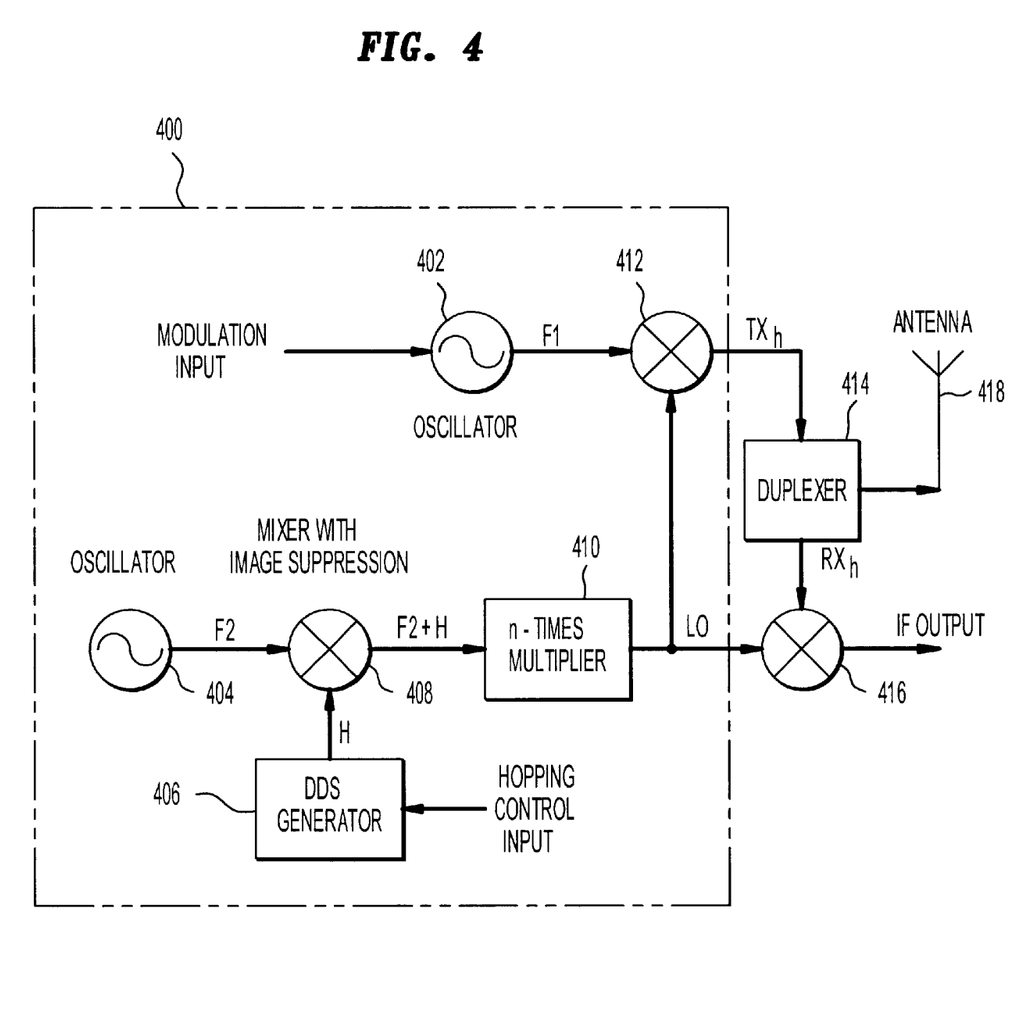
FIG. 4 illustrates a transmitter for use in a cordless telephone system according to the present invention.

FIG. 4 is a functional diagram of a transmitter section 400 which may suitably be used as the first transmitter 208 in the handset of FIG. 2. The transmitter section 400 may similarly be used as the second transmitter 228 in the base station of FIG. 2, but to avoid duplication only its use as the first transmitter 208 will be discussed. The transmitter section 400 produces the first modulated carrier signal discussed above in connection with FIG. 2, and the second modulated carrier signal produced by the base station 202 is used to control frequency hopping by the transmitter section 400. The first modulated carrier signal has a variable frequency designated here by $TX_h$. The second modulated carrier signal has a variable frequency designated here by $RX_h$. The transmitter section 400 includes a first oscillator 402, which receives a first modulation input signal and produces a first oscillator signal having a variable frequency designated here by F1. The transmitter section 400 further includes a second oscillator 404 which produces a second oscillator signal having a variable frequency designated here by F2. The transmitter section 400 also includes a DDS generator 406, which receives the hopping control signal and produces a hopping signal having a variable frequency designated here by H. The frequency range and number of steps of the DDS generator 406 are dictated by overall system requirements and the needed frequency range which must be covered for the frequency $TX_h$ of the first modulated carrier signal and the frequency $RX_h$ of the second modulated carrier signal produced by the base station 202 and used to control frequency hopping by the handset 202, as well as cost considerations. The transmitter section 400 further includes a second oscillator 404, which produces a second oscillator signal having a variable frequency designated here by F2, a first mixer 408 which mixes the second oscillator signal and the hopping control signal while providing image suppression, and an n-times multiplier 410, which produces a first local oscillator signal having a variable frequency designated here by LO. The frequency F2 of the second oscillator signal is chosen so that (F2+H) x n is equal to the desired value of LO.

This is the frequency of the first local oscillator signal produced by the transmitter section 400 and used to control frequency hopping by the first receiver. Also, the range of H frequencies needs to be such that when H goes from its lowest to highest value, the nth harmonic of (F2+H) covers the whole range of local oscillator frequencies. The transmitter section 400 further includes a second mixer 412. The second mixer 412 receives the first oscillator signal and produces the first modulated carrier signal. Also shown, but not part of the transmitter section 400, are a duplexer 414, a third mixer 416 and an antenna 418. The antenna 418 transmits the first modulated carrier signal from the handset and receives the second modulated carrier signal from the base station. The duplexer 414 receives the second modulated carrier signal from the antenna 418 and passes it to the third mixer 416, while simultaneously passing the first modulated carrier signal from the second mixer 412 to the antenna 418. The third mixer 416 receives the first local oscillator signal from the n-times multiplier 410 and combines it with the second modulated carrier signal to produce an IF output signal having a variable frequency designated here by IF. The IF output signal may be passed to a demodulator (not shown), or alternatively may be passed to another mixer (not shown) to perform a second frequency conversion before demodulation. Either alternative may be suitably employed in accordance with the present invention, with the choice of alternatives being dictated by particular design requirements.

Figure 5:
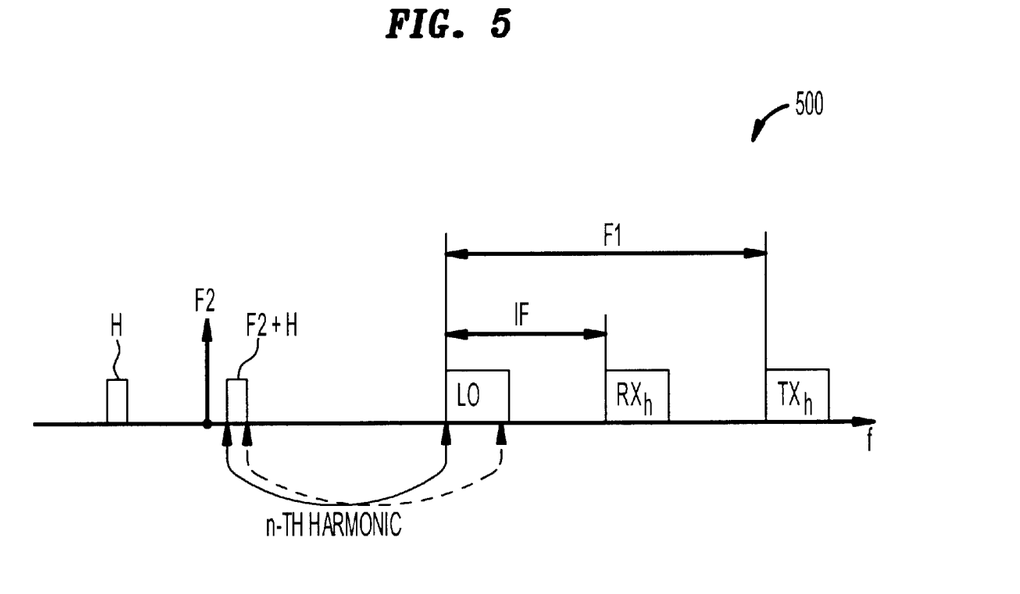
FIG. 5 is a frequency plan preferably used by a handset of a cordless telephone system according to the present invention.

FIG. 5 is a graph 500 illustrating an overall frequency plan for a handset according to the present invention, with relative values shown for H, F2, F2+H, LO, $TX_h$, $RX_h$, F1, and IF. The frequency $TX_h$ is the frequency of the first modulated carrier signal, which is transmitted by the handset to the base station. The frequency $RX_h$, is the frequency of the second modulated carrier signal, which is received by the handset from the base station. The graph 500 illustrates a configuration employing a low side injection for $TX_h$ and $RX_h$. The frequency range of $TX_h$ is higher than the frequency range for $RX_h$. The frequency F1 is the difference between LO and $TX_h$, while the frequency IF is the difference between LO and $RX_h$. However, a high side injection could be used for both $RX_h$ and $TX_h$, as well as any combination such as low side for $RX_h$ and high side for $TX_h$. The range for H frequencies is typically relatively low, on the order of hundreds of kHz. F2 is typically on the order of tens of MHz, as are F1 and IF. Frequency ranges for LO, $TX_h$ and $RX_h$ are equal. In the unlicensed 900 MHz band typically employed for cordless telephone systems, the ranges for LO, $TX_h$ and $RX_h$ are typically 10–12 MHz.

Figure 6:
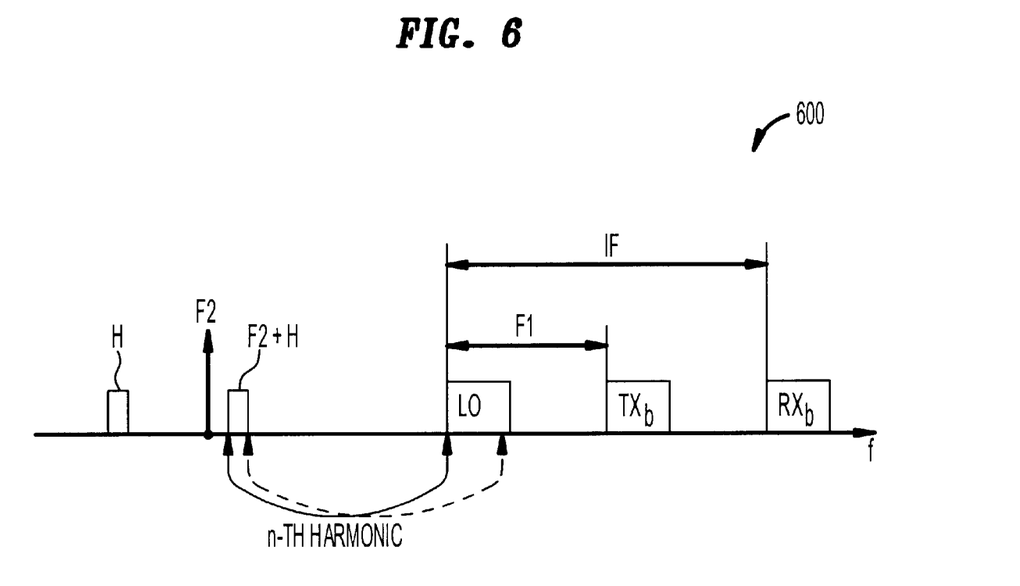
FIG. 6 is a frequency plan which may be used by a base station of a cordless telephone system according to the present invention.

FIG. 6 is a graph 600 illustrating an overall frequency plan for a base station according to the present invention, with relative values shown for H, F2, F2 +H, LO, $TX_b$, $RX_b$, F1, and IF. In the case of the base station, $RX_b$ is the frequency of the first modulated carrier signal received by the handset from the base station, and has the same value as $TX_h$ described in FIG. 5. The frequency $TX_b$ is the frequency of the second modulated carrier signal transmitted by the base station to the handset, and has the same value as $RX_h$ described above. Because $TX_b$ and $RX_b$ represent the same frequencies as do $RX_h$ and $TX_h$, respectively, the frequency ranges for $TX_b$ and $RX_b$ are reversed with respect to $TX_h$ and $TX_h$. The frequency range of $RX_b$ is higher than the frequency range for $TX_b$. As with the frequency plan of FIG. 5, the frequency F1 is the difference between LO and $TX_b$, while the frequency IF is the difference between LO and $RX_b$. However, in the frequency plan of FIG. 6, the frequency IF is greater than the frequency F1.

Figure 7:
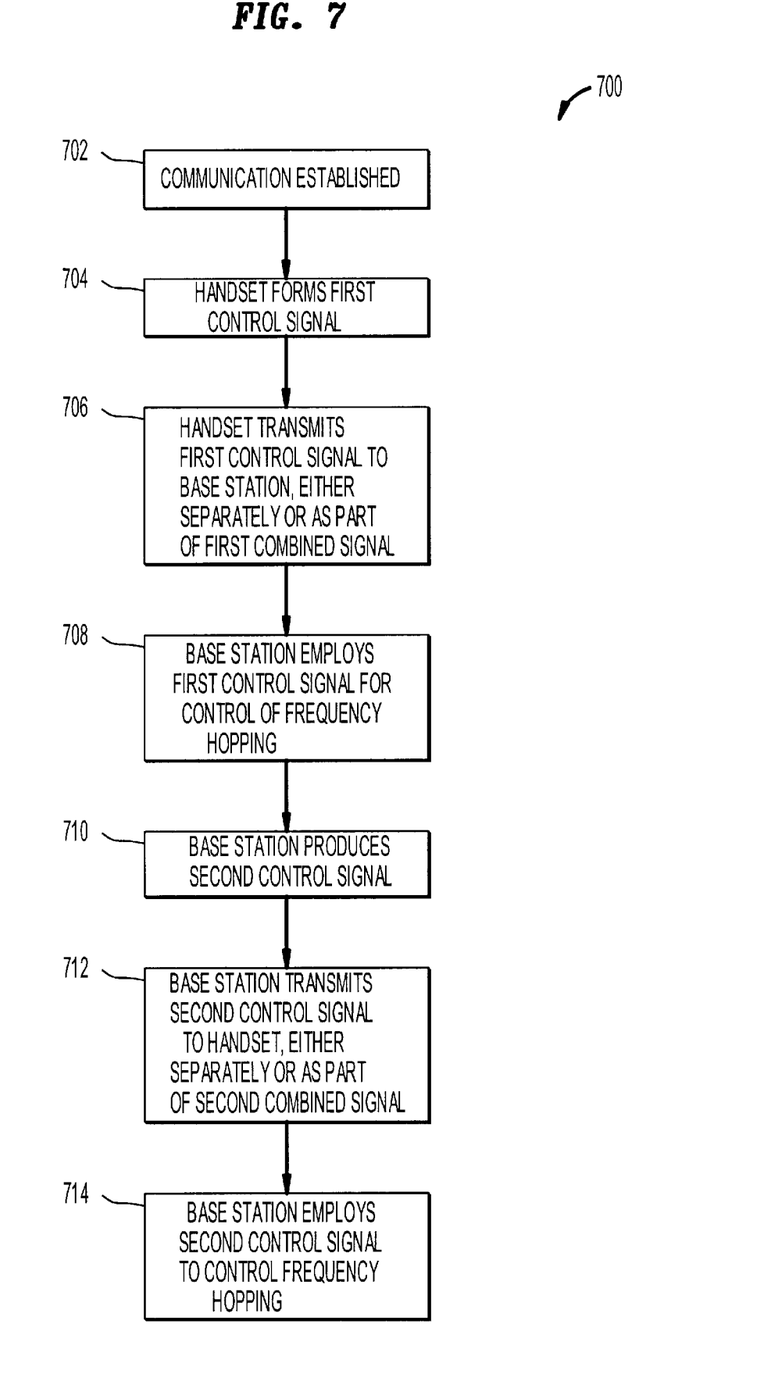
FIG. 7 is a flowchart illustrating the steps of a method for frequency-hopping cordless telephony according to the present invention.

FIG. 7 is a flowchart illustrating the steps of a method 700 for cordless telephony according to the present invention. At step 702, communication is established between a handset and a base station, such as the handset 201 and the base station 202 of FIG. 2. The handset and the base station transmit analog signals for communication of user information. At step 704, the handset produces a first control signal for control of frequency hopping in the base station. The first control signal may suitably be combined with a first communications signal for transmitting user information to the base station to form a first combined signal. The first communications signal an analog signal, while the first control signal may be an analog or a digital signal. At step 706, the handset transmits the first control signal to the base station, either together with the first communications signal as part of a first combined signal, or separately from the first communications signal, depending on design choice. At step 708, the base station employs the first control signal to control frequency hopping by the base station. At step 710, the base station produces a second control signal for control of frequency hopping in the handset. The second control signal may suitably be combined with a second communications signal for transmitting user information to the handset to form a second combined signal. The second communications signal is preferably an analog signal, while the second control signal may be an analog or a digital signal. At step 712, the base station transmits the second control signal to the handset, either together with the second communications signal as part of a second combined signal, or separately from the second communications signal, depending on design choice. At step 714, the handset employs the second control signal to control frequency hopping by the handset.

Steps 704–714 of the method 700 need not and typically may not be executed sequentially. For example, steps 704–708 are executed when the handset transmits a message to the base station, and steps 710–714 are executed when the base station transmits a message to the handset.

Figure 8:
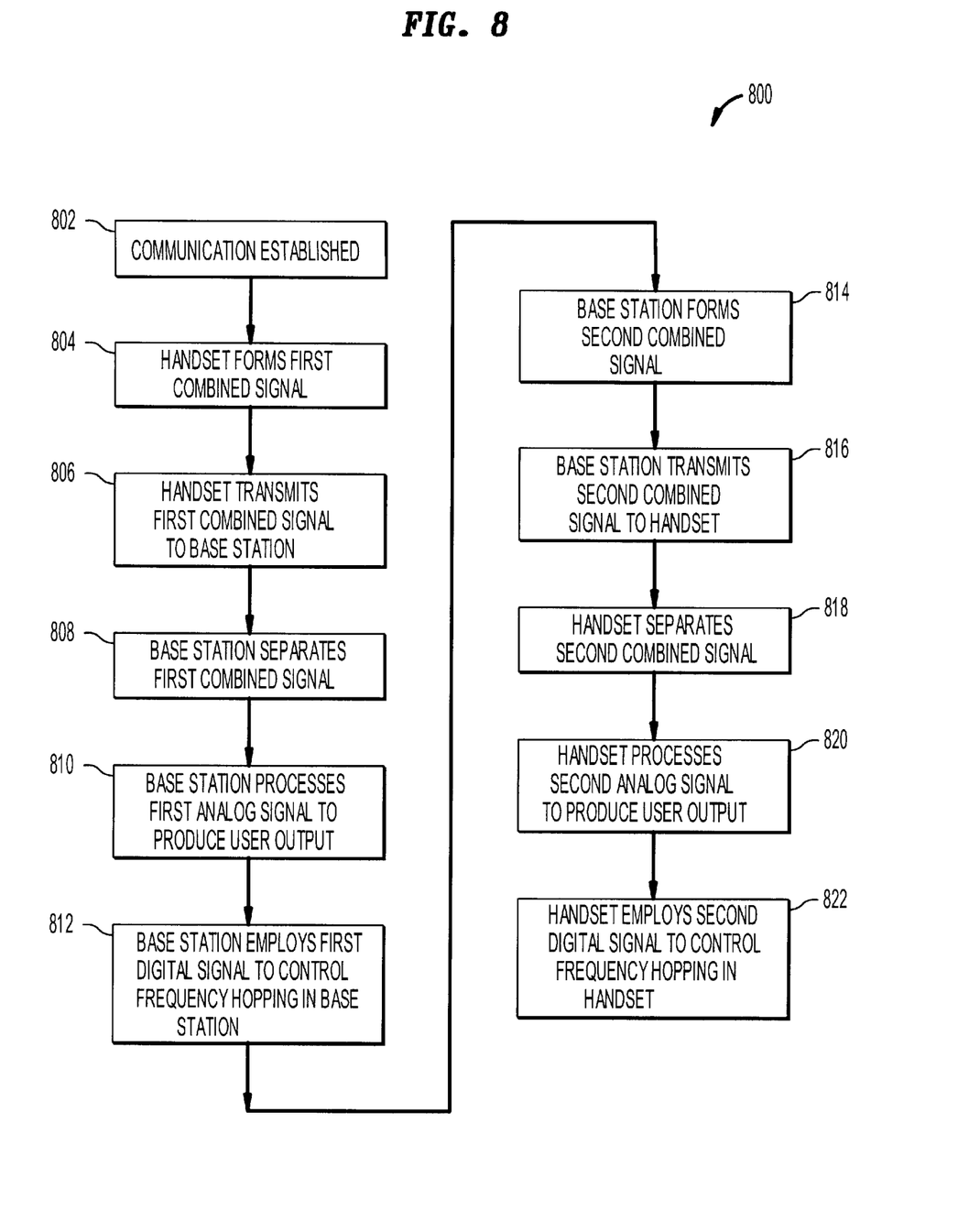
FIG. 8 is a flowchart illustrating the steps of an alternative method for frequency-hopping cordless telephony according to the present invention.

FIG. 8 is a flowchart illustrating the steps of an alternative method 800 for cordless telephony according to the present invention. At step 802, communication is established between a handset and a base station, such as handset 201 and base station 202 of FIG. 2. At step 804, the handset combines a first analog signal with a first digital signal to form a combined signal. At step 806, the handset transmits the combined signal to the base station. At step 808, the base station receives the combined signal and separates the combined signal to recover the first analog signal and the first digital signal. At step 810, the base station processes the first analog signal to produce an output for a user. At step 812, the base station employs the first digital signal to control frequency hopping by the base station. At step 814, the base station combines a second analog signal with a second digital signal to form a second combined signal. At step 816, the base station transmits the second combined signal to the handset. At step 818, the handset receives the second combined signal and separates the second combined signal to recover the second analog signal and the second digital signal. At step 820, the handset processes the second analog signal to produce output for a user. At step 822, the handset employs the second digital signal to control frequency hopping by the handset.

Steps 804–822 of the method 800 need not and typically may not be executed sequentially. For example, steps 804–812 are executed when the handset transmits a message to the base station, and steps 814–822 are executed when the base station transmits a message to the handset.

While the present invention is disclosed in the context of a presently preferred embodiment, it will be recognized that a wide variety of implementations may be employed by persons of ordinary skill in the art consistent with the above discussion and the claims which follow below. For example, although the preferred embodiment employs a signal having a digital component to control frequency hopping and an analog component to transmit user information, it will be noted that a telephone system according to the invention may be constructed which employs a signal using an analog component for the control of frequency hopping.

I claim:

1. A handset for use in a cordless telephone system comprising:

a first receiver;

a first transmitter operative to produce a first modulated carrier signal containing analog communication information and first frequency hopping information controlling frequency hopping in a second receiver and a second transmitter of a base station, the first frequency hopping information including information directing the timing of frequency hopping and the frequencies to be used; and a first signal combiner operative to receive a first analog signal and a first control data signal to form a first modulation input signal for use by the first transmitter in producing the first modulated carrier signal, the first analog signal containing the analog communication information and the first control data signal containing the first frequency hopping information.

wherein the first control data signal is a digital signal;

wherein the first receiver and the first transmitter are operative to perform frequency hopping based on second frequency hopping information contained in a second modulated carrier signal received from the base station wherein the first receiver includes a demodulator to demodulate the second modulated carrier signal received from the base station to produce a first demodulated signal and wherein the handset further includes a signal separator to receive the first demodulated signal and produce a first analog output signal and pass the first analog output signal to a loudspeaker to produce user output, the signal separator being further operative to produce a first digital output signal and pass the first digital output signal to a first control unit, the first control unit being operative to produce a first hopping control signal based on the first digital output signal, and wherein the first transmitter is operative to receive the first hopping control signal as a first hopping control input and change frequencies based on the first hopping control input.

2. The handset of claim 1 wherein the first transmitter is operative to produce a first local oscillator signal based on the first hopping control input and wherein the first receiver is operative to change frequencies based on the first local oscillator signal.

3. A base station for use in a cordless telephone system comprising:

a first receiver;

a first transmitter operative to produce a first modulated carrier signal containing analog communication information and first frequency hopping information controlling frequency hopping in a second receiver and a second transmitter of a handset, the first frequency hopping information including information directing the timing of frequency hopping and the frequencies to be used; and a first signal combiner operative to receive a first analog signal and a first control data signal to form a first modulation input signal for use by the first transmitter in producing the first modulated carrier signal, the first analog signal containing the analog communication information and the first control data signal containing the first frequency hopping information;

wherein the first control data signal is a digital signal, wherein the first receiver and the first transmitter are operative to perform frequency hopping based on second frequency hopping information contained in a second modulated carrier signal received from the handset, wherein the first receiver includes a first demodulator to demodulate the second modulated carrier signal received from the handset to produce a fist demodulated signal and wherein the base station further includes a first signal separator to receive the first demodulated signal and produce a first analog output signal and pass the first analog output signal to a line interface to produce user output, the first signal separator being further operative to produce a first digital output signal and pass the first digital output signal to a first control unit, the first control unit being operative to produce a first hopping control signal based on the first digital output signal, and wherein the first transmitter is operative to receive the first hopping control signal as a first hopping control input and change frequencies based on the first hopping control input.

4. The base station of claim 3 wherein the first transmitter is operative to produce a first local oscillator signal based on the first hopping control input and wherein the first receiver is operative to change frequencies based on the first local oscillator signal.

5. A cordless telephone system comprising:

a handset including a first transmitter and a first receiver, the first transmitter being operative to transmit a first combined signal having a first digital portion and a first analog portion, the first analog portion containing communication information, the first digital portion containing frequency hopping data employed to control frequency hopping by a base station, the first receiver being operative to receive from the base station a second combined signal comprising a second digital portion and a second analog portion, the handset further including a first signal separator to separate the second combined signal to form a second digital output signal and second analog output signal, the second analog output signal being employed to convey communication information, the second digital output portion being employed to control frequency hopping by the handset; and a base station including a second transmitter and a second receiver, the second transmitter being operative to transmit the second combined signal, having a second digital portion and a second analog portion, the second digital portion containing frequency hopping data employed to control frequency hopping by the handset, the second receiver being operative to receive from the handset a first combined signal comprising a first digital portion and a first analog portion, the base station further including a signal separator to separate the digital portion and the analog output portion, the analog output portion being employed to convey communication information, the digital portion being employed to control frequency hopping by the base station.

6. A handset for use in a cordless telephone, comprising:

a first transmitter for transmitting a first modulated carrier signal to a base station, the transmitter being operative to receive a first modulation input signal and create the first modulated carrier signal, the first modulated carrier signal having a frequency $TX_h$, the first modulated carrier signal being based on the first modulation input signal, the first transmitter being operative to change frequencies based on a first hopping control signal, the first transmitter being further operative to produce a first local oscillator signal based on the first hopping control signal, the first local oscillator signal having a frequency LO, the first transmitter supplying the first local oscillator signal to the first receiver to enable frequency change in the first receiver; and a first receiver for receiving a second modulated carrier signal from the base station, the second modulated carrier signal having a frequency $RX_h$, the receiver producing the first hopping control signal based on information contained in the second modulated carrier signal.

7. The handset of claim 6, wherein the transmitter is operative to change the frequency $TX_h$ and the frequency LO essentially simultaneously.

8. The handset of claim 7 wherein the first modulated carrier signal comprises an analog portion and a digital portion, the digital portion being employed to direct frequency hopping in a transmitter of the base station.

9. The handset of claim 8 wherein the first receiver is operative to process the second modulated carrier signal to recover a first digital output signal and a first analog output signal.

10. The handset of claim 9 and also including a first control data unit, the first control data unit being operative to receive the first digital output signal from the receiver and to produce the first hopping control signal based on the first digital output signal.

11. The handset of claim 10, wherein the first transmitter comprises:

a first oscillator for receiving the first modulation input signal and producing a first oscillator signal having a frequency F1;

a second oscillator for producing a second oscillator signal having a frequency F2;

a direct digital synthesis generator for receiving the first hopping control signal and producing a first hopping signal based on the first hopping control signal, the first hopping signal having a frequency H;

a first mixer for combining the second oscillator signal and the first hopping signal to produce a first mixed signal having a frequency F2+H;

an n-times multiplier for multiplying the first mixed frequency to produce a first local oscillator signal having a frequency LO equal to (F2+H)*n; and a second mixer for combining the first oscillator signal and the first local oscillator signal to produce the first modulated carrier signal, the first modulated carrier signal having a frequency $TX_h$ equal to LO+F1.

12. The handset according to claim 11 and also including a duplexer and an antenna, the duplexer being operative to transmit the first modulated carrier signal to the base station through the antenna, the duplexer being further operative to receive the second modulated carrier signal from the base station through the antenna.

13. The handset according to claim 12 and also including a third mixer for combining the local oscillator signal and the second modulated carrier signal received from the base station to produce an IF output signal having a frequency IF.

14. The handset of claim 13, wherein the frequency H spans a range lower than the frequency F2, the sum F2+H spans a range higher than the frequency F2 and lower than the frequency LO, the sum of the frequency F2 and the frequency H having an nth harmonic spanning a range of the frequency F2, the frequency $TX_h$ spans a range higher than the local oscillator frequency, and the frequency $TX_h$ spans a range higher than the frequency $RX_h$.

15. The handset of claim 14 wherein the frequency F1 spans a range between a low end of the range of the frequency LO and a low end of the range of the frequency $TX_h$.

16. The handset of claim 15 wherein the transmit carrier signal comprises an analog signal combined with a spread signal, the spread signal comprising a digital data signal multiplied by a spreading signal.

17. A base station for use in a cordless telephone, comprising:

a first receiver for receiving a first modulated carrier signal from a handset, the first modulated carrier signal having a frequency $RX_b$, and producing a first hopping control signal based on information contained in the first modulated carrier signal;

a first transmitter for transmitting a second modulated carrier signal to the handset, the first transmitter being operative to receive a first modulation input signal and create the second modulated carrier signal, the second modulated carrier signal being based on the first modulation input signal, the second modulated carrier signal having a frequency $TX_b$, the second transmitter being operative to change frequencies based on the first hopping control signal, the first transmitter being further operative to produce a first local oscillator signal based on the first hopping control signal, the first local oscillator signal having a frequency LO, the first transmitter supplying the first local oscillator signal to the first receiver to enable frequency change in the first receiver.

18. The base station of claim 17, wherein the transmitter is operative to change the frequency $TX_b$ and the frequency LO essentially simultaneously.

19. The base station of claim 18 wherein the second modulated carrier signal comprises an analog portion and a digital portion, the digital portion being employed to direct frequency hopping in a transmitter of the handset.

20. The base station of claim 19 wherein the receiver is operative to process the first modulated carrier signal to recover a first digital output signal and a first analog output signal.

21. The base station of claim 20, and also including a first control data unit, the first control data unit being operative to receive the first digital output signal and to produce the first hopping control signal based on the first digital output signal.

22. The base station of claim 21, wherein the first transmitter comprises:
 a first oscillator for receiving the first modulation input signal and producing a first oscillator signal having a frequency F1;
 a second oscillator for producing a second oscillator signal having a frequency F2;
 a direct digital synthesis generator for receiving the first hopping control signal and producing a first hopping signal based on the first hopping control signal, the first hopping signal having a frequency H;
 a first mixer for combining the second oscillator signal and the hopping signal to produce a first mixed signal having a frequency F2+H;
 an n-times multiplier for multiplying the first mixed frequency to produce the first local oscillator signal equal to (F2+H)*n; and
 a second mixer for combining the first oscillator signal and the second local oscillator signal to produce the second modulated carrier signal.

23. The base station of claim 22, and also including a duplexer and an antenna, the duplexer being operative to transmit the second modulated carrier signal to the handset through the antenna, the duplexer being further operative to receive the first modulated carrier signal from the handset through the antenna.

24. The base station of claim 23, and also including a third mixer for combining the local oscillator signal and the first modulated carrier signal received from the handset to produce an IF output signal having a frequency IF.

25. The base station of claim 24, wherein the frequency H spans a range lower than the frequency F2, the sum F2+H spans a range higher than the frequency F2 and lower than the frequency LO, the sum of the frequency F2 and the frequency H having an nth harmonic spanning a range of the frequency F2, the frequency $RX_b$ spans a range higher than the frequency LO, and the frequency $TX_b$ spans a range lower than the frequency $RX_b$.

26. The base station of claim 25 wherein the frequency F1 spans a range between a low end of the range of the frequency LO and a low end of the range of the frequency $TX_b$.

27. The base station of claim 26, wherein the second modulated carrier signal comprises an analog signal combined with a spread signal, the spread signal comprising a digital data signal multiplied by a spreading signal.

28. A cordless telephone system comprising:
 a base station;
 a handset;
 a first transmitter and a first receiver within the handset, the first receiver being operative to receive a first modulated carrier signal from the base station, the first modulated carrier signal comprising a first digital portion and a first analog portion, the first receiver being operative to demodulate the first modulated carrier signal to recover the first digital portion and the first analog portion, the handset being operative to employ the first analog portion to recover communication data and to employ the first digital portion to control frequency hopping by the first transmitter and the first receiver, the first transmitter being operative to produce a second modulated carrier signal for transmission to the base station, the second modulated carrier signal comprising a second digital portion and a second analog portion; and
 a second transmitter and a second receiver within the base station, the second receiver being operative to receive the second modulated carrier signal from the handset, the second receiver being operative to demodulate the second modulated carrier signal to recover the second digital portion and the second analog portion, the base station being operative to employ the second analog portion to recover communication data and to employ the second digital portion to control frequency hopping by the second transmitter and the second receiver.

29. The telephone system of claim 28 wherein the handset employs the first digital portion to produce a first hopping control signal and the base station employs the second digital portion to produce a second hopping control signal.

30. The telephone system of claim 29 wherein the first transmitter produces a first local oscillator signal based on the first hopping control signal and supplies the first local oscillator signal to the first receiver to control frequency hopping by the first receiver and the second transmitter produces a second local oscillator signal based on the second hopping control signal and supplies the second local oscillator signal to the second receiver to control frequency hopping by the second receiver.

31. The telephone system of claim 30 wherein the first transmitter receives the first hopping control signal and supplies it to a direct digital synthesis generator to produce a first hopping signal and wherein the second transmitter receives the second hopping control signal and supplies it to a direct digital synthesis generator to produce a second hopping signal.

32. A method of frequency-hopping cordless telephony comprising the steps of:
 establishing communication of analog user information between a base station and a handset;
 producing a first control signal for control of frequency hopping by the base station, the first control signal including information directing the timing of frequency hopping and the frequencies to be used;
 transmitting the first control signal from the handset to the base station;
 employing the first control signal to control frequency hopping by a transmitter and a receiver of the base station;

transmitting a second control signal from the base station to the handset for control of frequency hopping by the handset, the second control signal including information directing the timing of frequency hopping and the frequencies to be used; and employing the second control signal to control frequency hopping by a transmitter and a receiver of the handset, wherein the step of producing a first control signal is followed by a step of combining the first control signal with a first communication signal including the analog user information and wherein the step of transmitting the first control signal includes combining the first control signal with the first communication signal to produce a fist combined signal and transmitting the first combined signal to the base station, and wherein the step of producing a second control signal is followed by a step of combining the second control signal with a second communication signal including the analog user information and wherein the step of transmitting the second control signal includes combining the second control signal with the second communication signal to produce a second combined signal and sitting the first combined signal to the handset.

33. A method of frequency-hopping cordless telephony comprising the steps of:

establishing communication between a base station and a handset;

transmitting a first combined signal from the handset to the base station, the combined signal comprising a first analog portion and a first digital portion;

processing the first combined signal at the handset to recover a first analog signal and a first digital signal;

employing the first analog signal to produce user output; and employing the first digital signal to control frequency hopping by a transmitter and a receiver of the base station, the first digital signal including information directing the timing of frequency hopping and the frequencies to be used.

34. The method of claim 33 and further comprising the steps of:

transmitting a second combined signal from the base station to the handset, the second combined signal comprising a second analog portion and a second digital portion;

processing the second combined signal at the handset to recover a second analog signal and a second digital signal;

employing the second analog signal to produce user output; and employing the second digital signal to control frequency hopping by a transmitter and a receiver of the handset, the second digital signal including information directing the timing of frequency hopping and the frequencies to be used.

* * * * *